United States Patent
Szuba et al.

(10) Patent No.: US 8,142,293 B2
(45) Date of Patent: Mar. 27, 2012

(54) UNIVERSAL JOINT ASSEMBLY FOR AN AUTOMOTIVE DRIVELINE SYSTEM

(75) Inventors: Joseph Szuba, Dearborn, MI (US); Brian Nosakowski, Macomb, MI (US)

(73) Assignee: Ronjo Company, LLC, Orion, MI (US)

( * ) Notice: Subject to any disclaimer, the term of this patent is extended or adjusted under 35 U.S.C. 154(b) by 0 days.

(21) Appl. No.: 11/939,031

(22) Filed: Nov. 13, 2007

(65) Prior Publication Data

US 2008/0070705 A1 Mar. 20, 2008

Related U.S. Application Data

(62) Division of application No. 11/262,622, filed on Oct. 31, 2005, now Pat. No. 7,320,645.

(60) Provisional application No. 60/623,674, filed on Oct. 29, 2004, provisional application No. 60/636,190, filed on Dec. 15, 2004.

(51) Int. Cl.
 *F16D 3/40* (2006.01)
(52) U.S. Cl. ........................................ 464/134
(58) Field of Classification Search ............. 464/11–14, 464/134–136; 403/57; D15/148
 See application file for complete search history.

(56) References Cited

U.S. PATENT DOCUMENTS

| | | | | |
|---|---|---|---|---|
| 2,067,283 | A * | 1/1937 | Padgett | 464/134 |
| 4,522,608 | A * | 6/1985 | Joyner | 464/134 |
| 4,702,722 | A * | 10/1987 | Narue et al. | 464/134 X |
| 4,881,924 | A * | 11/1989 | Gall | 464/134 |
| 4,995,849 | A * | 2/1991 | Castellon | 464/134 |
| 5,326,322 | A * | 7/1994 | Fechter | 464/11 |

\* cited by examiner

*Primary Examiner* — Gregory Binda
(74) *Attorney, Agent, or Firm* — Howard & Howard Attorneys PLLC

(57) ABSTRACT

A driveline system for an automotive driveline system includes a transmission device, a differential device, and a universal joint having a drive shaft presenting terminal ends and interconnecting the transmission and differential devices. A yoke is connected to each of the terminal ends of the drive shaft and presents an internal surface and an external surface having generally equal thickness defined therebetween to form a dish of the yoke having a tubular monolithic structure. The yoke portion includes a bottom and a pair of spaced lugs each presenting sloping side walls for reinforcing the lugs as said yoke is rotated around a longitudinal axis.

6 Claims, 8 Drawing Sheets

UNIVERSAL JOINT ASSEMBLY FOR AN AUTOMOTIVE DRIVELINE SYSTEM

RELATED APPLICATIONS

This is a divisional patent application of a non-provisional patent application Ser. No. 11/262,622 filed on Oct. 31, 2005, now U.S. Pat. No. 7,320,645 that claims the benefit of the provisional patent application Ser. Nos. 60/623,674 for a VEHICLE HAVING A UNIVERSAL JOINT DEVICE AND A PROCESS OF MAKING THE SAME, filed on Oct. 29, 2004 and 60/636,190 for a UNIVERSAL JOINT ASSEMBLY FOR AN AUTOMOTIVE DRIVELINE SYSTEM, filed on Dec. 15, 2004, which are hereby incorporated by reference in their entireties.

BACKGROUND OF THE INVENTION

1. Field of the Invention

The subject invention relates generally to a driveline system for a vehicle transmission. More particularly, the present invention relates to a universal joint component of the driveline system and a method of forming the same.

2. Description of the Prior Art

A drive axle assembly of an automotive vehicle transmits torque from an engine and a transmission to drive vehicle wheels. The drive axle assembly changes the direction of the power flow, multiplies torque, and allows different speeds between the two of the drive wheels. The drive axle assembly includes a plurality of components engaged in operative communication one with the other. One of these components is a universal joint. Typically, the universal joint includes a pair of bifurcated yokes or yoke portions, which are secured to drive shafts and which are interconnected by a cruciform for rotation about independent axes. The cruciform includes four orthogonal trunnions with each opposing pair of axially aligned trunnions mounted in a pair of aligned bores formed in the bifurcated yokes.

Typically, a bearing cup is secured in each bore and a bearing assembly is retained in the bearing cup such that each yoke is supported for pivotal movement relative to a pair of the trunnions. Various conventional universal joints having yoke portions are known to those skilled in the vehicle driveline art and are widely used in the automotive industry today. These universal joints are disclosed in U.S. Pat. Nos. 4,307,833 to Barnard; 5,601,377 to Ohya; 5,622,085 to Kostrzewa; 5,845,394 to Abe et al.; 6,162,126 to Barrett et al.; 6,280,335 to Wehner et al.; 6,336,868 to Kurecka et al.; 6,408,708 to Sahr; 6,591,706 to Harer et al.; and 6,736,021 to Adams et al.

The U.S. Pat. No. 5,601,377 to Ohya, for example, teaches an automobile steering column that transmits the rotation of the steering wheel to the steering gearbox. For increasing the degree of freedom of geometric arrangement of the steering system, the steering column has a plurality of steering shafts which are connected with each other by universal joints. The universal joint, taught by the U.S. Pat. No. 5,601,377 to Ohya, has a pair of conventional yokes and a cross member. Each yoke has a base portion and a pair of arm portions or lugs opposed to each other in a diametral direction of the yoke and extend in an axial direction of the yoke. Each arm portion has a circular opening and sides extending in a parallel relationship with the axial direction of the yoke. The yoke of the U.S. Pat. No. 5,601,377 to Ohya is taught to be connected to a steering shaft and is not subjected to numerous rotational movements as, for example, a yoke portion connected to a universal joint of a driveline and is, therefore, not considered as being feasible for use on the driveline. In addition, the yoke does not include reinforcing features of any kind to prevent bending of the arm portions during rotation of the yoke.

The U.S. Pat. No. 5,845,394 to Abe et al., for example, teaches a method of manufacturing a yoke portion having two spaced lugs for a universal joint from a blank of a sheet metal to receive the yoke portion of a uniform thickness. Similar to the yoke taught by the aforementioned U.S. Pat. No. 5,601,377 to Ohya, the spaced lugs are not reinforced to provide structural integrity of the yoke portion. Again, the yoke portion is taught to be connected to a steering shaft and is not subjected to numerous rotational movements as, for example, a yoke portion connected to a universal joint of a driveline and is, therefore, not considered as being feasible for use on the driveline.

To reduce the effect of vibration and the resulting noises, manufacturers have used various methods to construct drive shafts and universal joints connected thereto. Typical prior art yoke portions are iron cast to provide durability but are difficult to balance.

The opportunity exists for an improved universal joint and method of manufacturing the same that will reduce the mass of the yoke portion thereby reducing the effect of vibrations and the resulting noises, add structural integrity to the universal joint, make it easier to balance, and increase performance of drive line applications at a low cost and a high volume.

BRIEF SUMMARY OF INVENTION

A differential assembly for an automotive driveline system includes a transmission device, a differential device, and at least one drive shaft that extends between the transmission and differential devices. The drive shaft presents an operative communication with the transmission device and the differential device. A universal joint device rotates around a longitudinal axis and presents operative communication with the transmission device and the differential device. The universal joint device includes at least one yoke portion having a dish defining an internal surface and an external surface. A generally equal thickness is defined between the internal surface and the external surface of the dish to form a generally monolithic and tubular construction of the yoke portion. The dish is defined by a bottom and an annular wall integral with the bottom. The annular wall extends to a pair of spaced lugs diametrically disposed with respect to one another. Each lug extends outwardly to a head. Each lug presents a neck being wider in width than the head and sloping side walls interconnecting the head with the neck for reinforcing the yoke portion as the yoke portion rotates around the longitudinal axis. Each lug is reinforced by at least one indentation or dimple press formed in the lug in a shape of a gusset or a rib.

A connector extends between the yoke portion to mechanically engage at least one of the transmission devices and the differential device to yoke portion thereby defining the aforementioned operative communication. The inventive yoke portion reduces vibration of the universal joint connected to the yoke portion of the generally equal thickness as the universal joint rotates about the longitudinal axis.

An advantage of the present invention is to provide an improved yoke portion for a universal join that is stamped from a sheet metal presenting a light weight alternative to an iron cast yoke portion known in the prior art, which reduces the effect of vibrations and the resulting noises.

Another advantage of the present invention is to provide an improved yoke portion that reduces the mass of the improved yoke portion thereby making it easier to balance and increase performance of the driveline applications at a low cost and a high volume.

Still another advantage of the present invention is to provide an improved yoke portion having a pair of spaced lugs and at least one gusset defined in each of the spaced lugs to provide structural integrity to the yoke portion that reduces the effect of vibrations and the resulting noises and increases performance of the driveline system at a low mass.

Still another advantage of the present invention is to provide an improved yoke portion wherein each spaced lug presents a central axis and sloping side walls inclined from the head to the neck thereby reducing stress applied to the yoke portion and preventing the spaced lugs from bending as the yoke portion rotates around the longitudinal axis.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
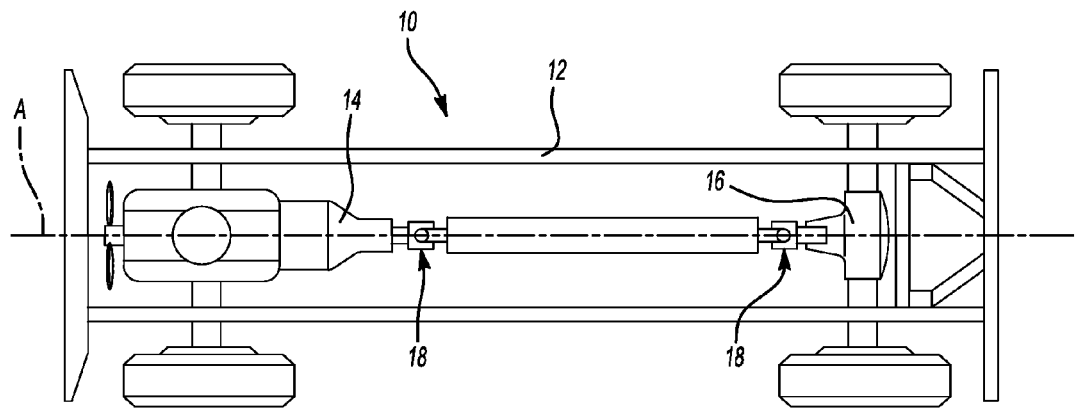
FIG. 1 shows an elevational view of a vehicle frame having a driveline system.
Figure 2:
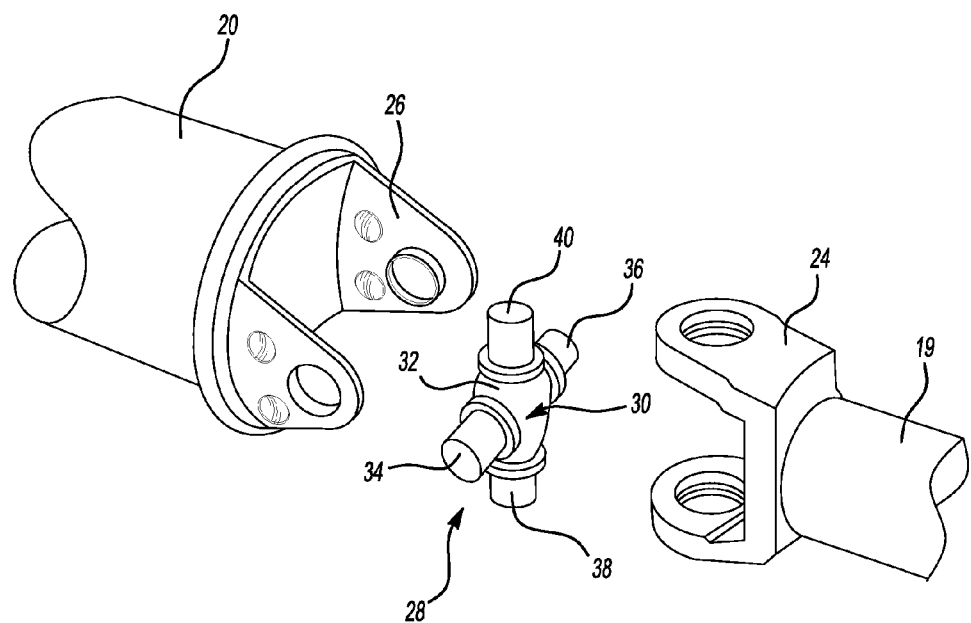
FIG. 2 is an exploded view of a universal joint assembly.
Figure 3:
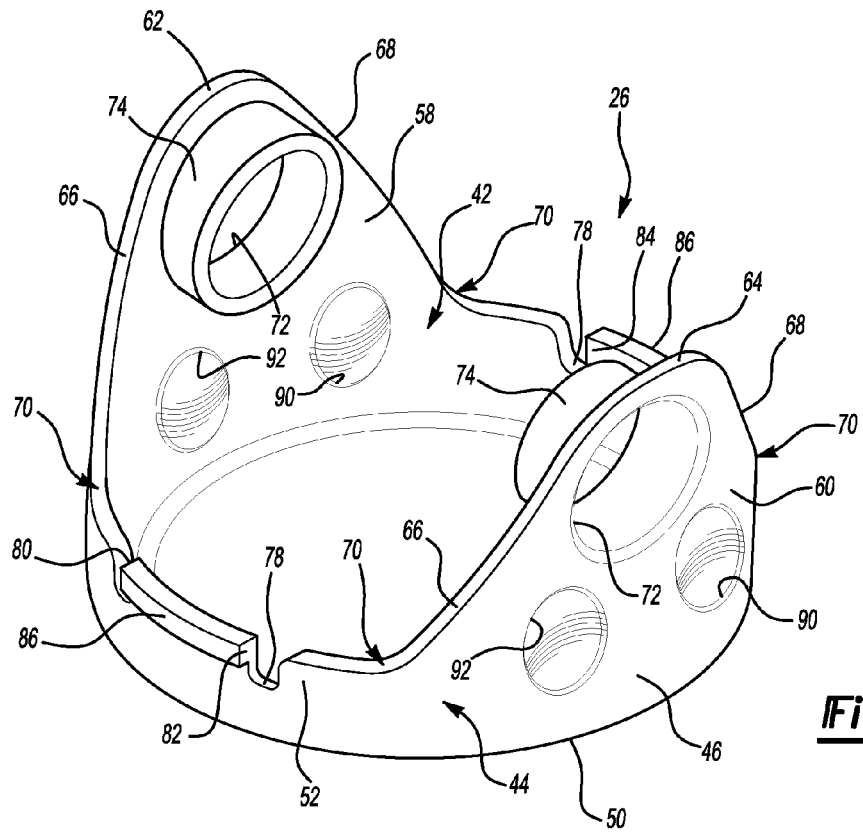
FIG. 3 is a perspective view of a yoke portion of the universal joint assembly.
Figure 4:
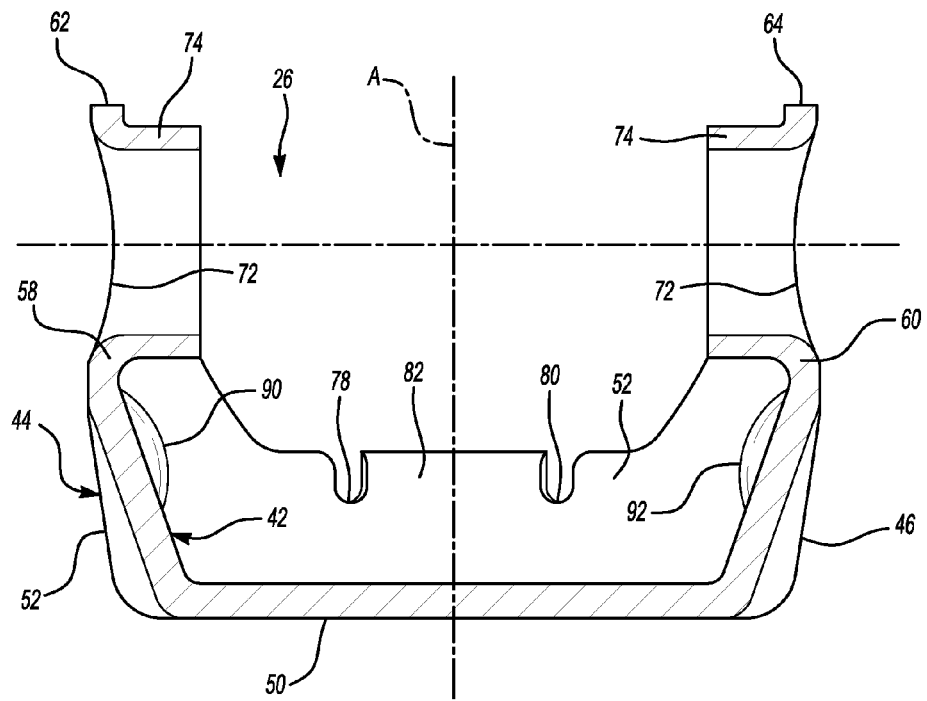
FIG. 4 is a cross sectional view of the yoke portion shown in FIG. 3.
Figure 5:
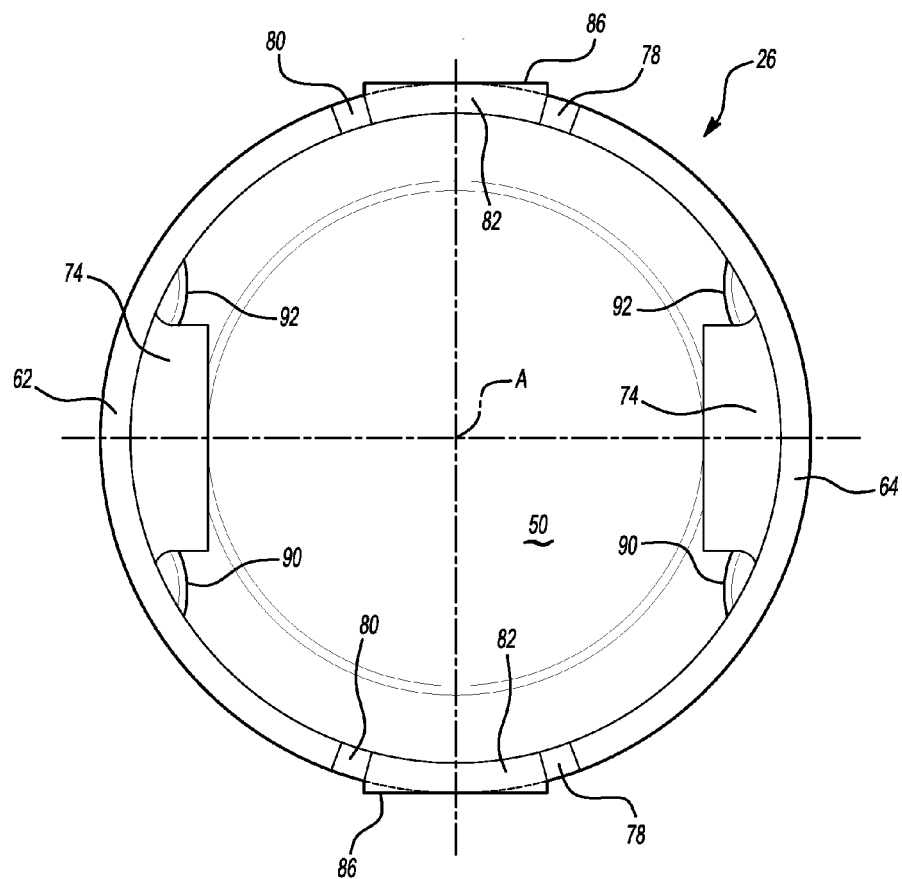
FIG. 5 is an elevational view of the yoke portion shown in FIG. 3.

Referring to FIG. 1, a chassis of an automotive vehicle, generally shown at 10, includes a frame 12 and a driveline mechanism. The driveline mechanism includes a transmission assembly 14, a differential assembly 16, and two universal joints, generally indicated at 18, extending between the transmission assembly 14 and the differential assembly 16 presenting an operative communication therebetween. The universal joint 18 rotates around a longitudinal axis A during its operational mode. The universal joint 18, as better illustrated in FIG. 2, includes a first drive shaft 19 and a second drive shaft 20 with a pair of yokes, such as, for example a first yoke 24 and a second yoke 26. The first yoke 24 is attached to the first drive shaft 19 and the second yoke or yoke portion 26 is attached to the second drive shaft 20.

A connector or cruciform assembly, generally shown at 28, interconnects the first yoke 24 and the second yoke 26. The cruciform assembly 28 includes a cross member, generally indicated at 30, has a central hub 32 and a pair of first trunnions 34 and 36 and a pair of second trunnions 38 and 40. The first trunnions 34 and 36 are orthogonal with respect to the second trunnions 38 and 40, with all of the trunnions 34, 36, 38, and 40 aligned within a common plane. The first trunnions 34 and 36 are cylindrical and are adapted for insertion into the first yoke 24. Similarly, the second trunnions 38 and 40 are cylindrical and are adapted to be inserted into the second yoke 26. The cruciform assembly 28 and the first yoke 24 are known to those skilled in a differential art and are not described and/or illustrated in great details.

Referring to FIGS. 3 through 7 the second yoke 26 is illustrated in great details showing a preferred embodiment of the present invention. The second yoke 26 is connected to each of the terminal ends of the second drive shaft 20 and presents an internal surface, generally indicated at 42, and an external surface, generally indicated at 44. The second yoke 26 presents a generally equal thickness defined between the internal surface 42 and the external surface 44. A cup portion or a dish 46 of the second yoke 26 includes a frustoconical configuration. The cup portion 46 has a bottom or base 50 defined by an upper annular wall 52.

A pair of spaced lugs 58 and 60 extend outwardly to a head 62, 64, respectively, from the annular wall 52. Sloping side walls 66 and 68 interconnect each of the heads 62 and 64 with the annular wall 52 to define a neck, generally indicated at 70, of each of the spaced lug 58 and 60. Each sloping side wall 66 and 68 presents an acute angle defined between the axis A and each sloping side wall 66 and 68. Each of the spaced lugs 58 and 60 includes an opening 72. Preferably, the diameter of the opening 72 equals the distance defined between the opening 72 and the bottom or base 50 of the cup portion 46. The spaced lugs 58 and 60 are oriented diametrically with respect to one and the other. Each of the spaced lugs 58 and 60 includes an annular sleeve 74 integral with and circumscribing the opening 72. The annular sleeve 74 extends outwardly from the internal surface 42 of the second yoke 26. The annular sleeve 74 presents a mechanical engagement with a pair of the first 34, 36 or second 38, 40 trunnions of the cruciform assembly 28 in a manner known to those skilled in the differential art. In addition, the annular sleeve 74 provides additional structural reinforcement for locking the pair of the first 34, 36 or second 38, 40 trunnions of the cruciform assembly 28 within and between the spaced lugs 58 and 60.

A plurality of notches 78 and 80 are defined in the annular wall 52. A pair of oppositely spaced tabs 82 and 84 is defined between each of the notches 78 and 80. Each of the spaced tabs 82 and 84 terminates in a folded lip portion 86 to strengthen the second yoke 26 in this area of cut off. A pair of dimples 90 and 92 are formed in each of the spaced lugs 58 and 60. Each dimple 90 and 92 is concavely curved to define a cavity as viewed from the external surface 44 of the yoke portion and a beveled configuration as viewed from the internal surface 42. Each dimple 90 and 92 extends from each spaced lug 58 or 60 to the bottom or base 50 the cup portion 46 with each of said dimples 90 and 92 formed below the annular sleeve 74. The dimples 90 and 92 are designed to strengthen the spaced lugs 58 and 60.

Figure 6:
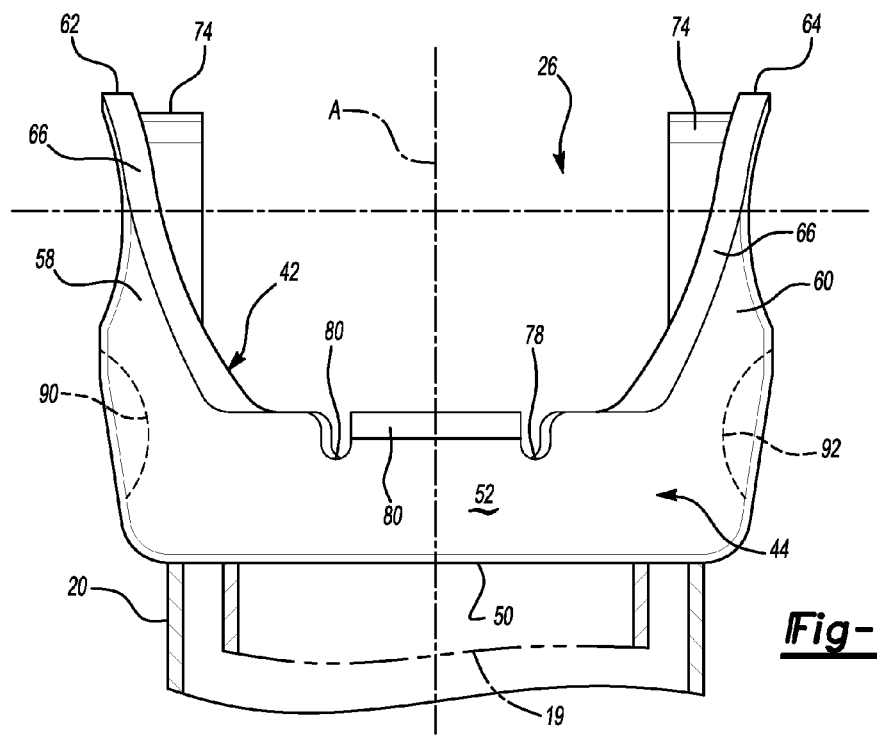
FIG. 6 is a side and partially cross sectional view of the yoke portion shown in FIG. 3 connected laser or spin welding to a drive shaft of various diameters.
Figure 7:
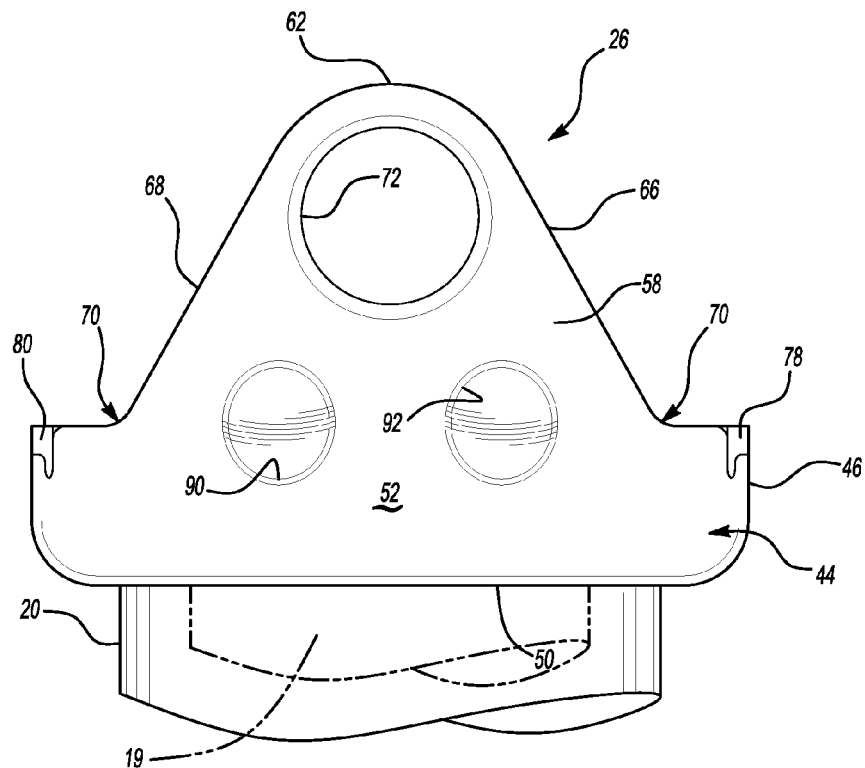
FIG. 7 an end view of the yoke portion shown in FIG. 6.

Referring to FIG. 6, the yoke portion 26 is connected to the first drive shaft 19 or the second drive shaft 20 of various diameters, which may vary from 3" to 3.5", respectively, by welding. Preferably, laser welding is used to connect. Laser welding uses amplified light as the source to produce the weld, i.e. specific wave length of light to accomplish the welding process. As a high production welding process, laser welding produces deep penetration welds with minimum heat effective zones and has the advantage of welding dissimilar metals while producing very low heat. Laser welding is faster, cleaner, and more cost effective for manufacturing the inventive concept.

Alternatively, the yoke portion 26 and the drive shaft 19 or 20 may be connected by spin or friction welding. Spin or friction welding uses heat generated by rotational friction at the joint line defined between the yoke portion 26 the drive shaft 19 or 20 to weld them together. A machine (not shown) applies pressure axially while rotating one of the part, such as, for example, the yoke portion 26 against its stationary positioned mate, such as, for example, the drive shaft 19 or 20, and the resulting friction generates heat that melts the parts together. Advantages of the spin welding process, used in the present invention, include high quality permanent joints, hermetic seals, lower equipment costs, ease of assembly, energy efficient operation, no ventilation required, immediate handling, entrapment of other parts, far-field welding capability and no additional material requirements.

The second yoke 26 includes an alternative embodiment, generally shown at 100 in FIGS. 8 through 11. The second yoke 100 presents a generally equal thickness defined between the internal surface, generally indicated at 102, and the external surface, generally indicated at 104. A cup portion or dish 106 of the second yoke 100 includes a frustoconical configuration. The cup portion 106 has a bottom or base defined by an annular wall 110 and forming the cup portion 106. A neck 112 extends outwardly from the annular wall 110. The neck 112 has a diameter sized to receive the drive shaft 20.

Figure 10:
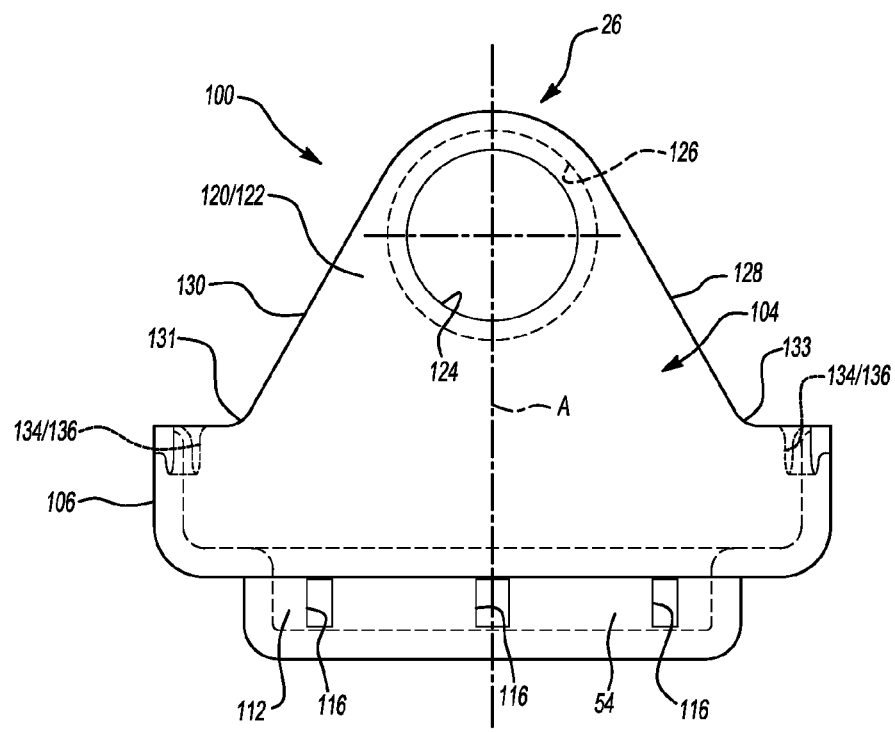
FIG. 10 is an end view of the yoke portion shown in FIG. 8.
Figure 11:
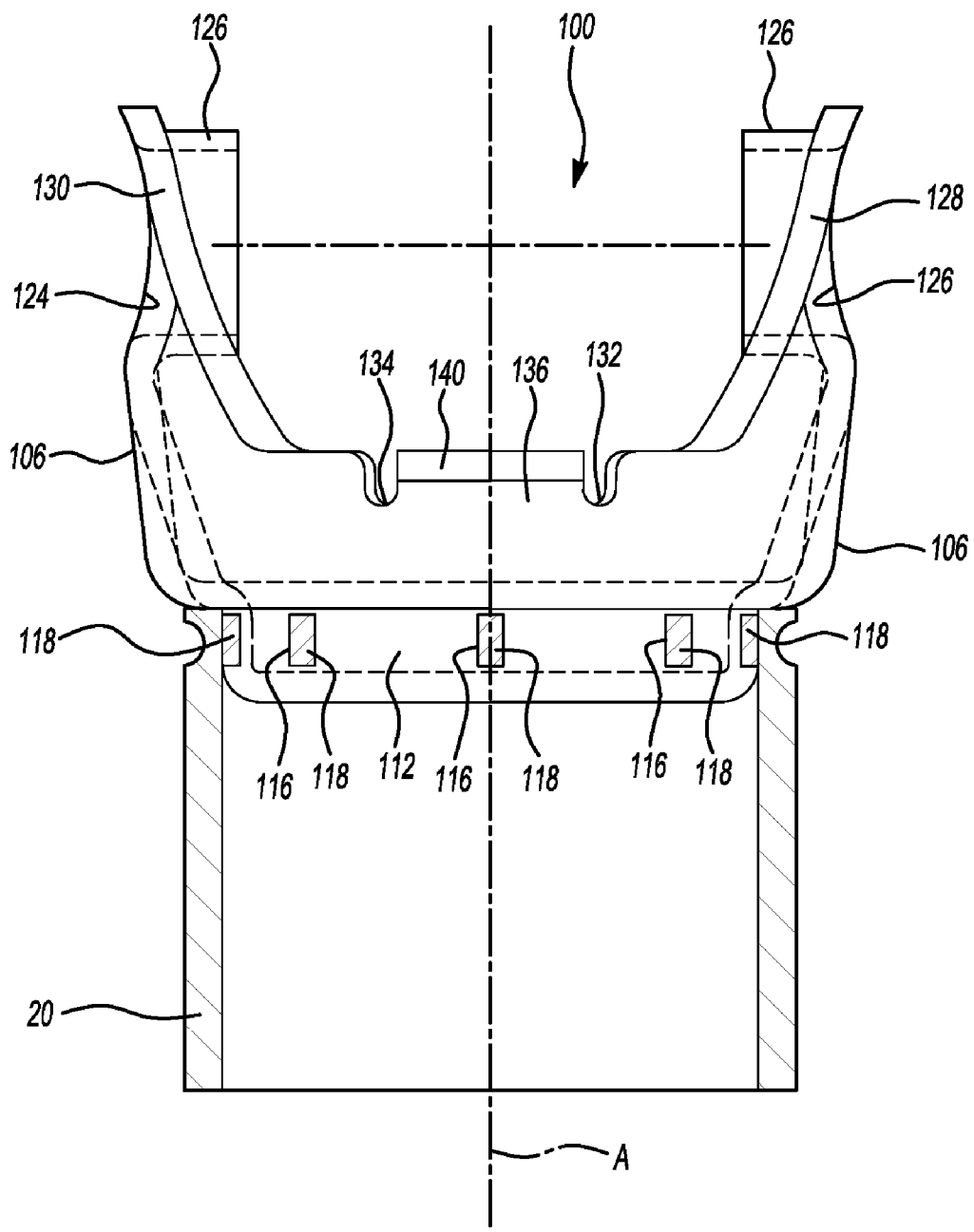
FIG. 11 is a side and partially cross sectional view of the yoke portion shown in FIG. 8 mechanically connected to the drive shaft.

As best shown in FIGS. 10 and 11, a plurality of circumferentially spaced female connectors 116 are defined in the neck 112 to mechanically engage the second drive shaft 20. A plurality of male connectors or protuberances 118 are defined in the internal surface of the drive shaft 20. The male connectors 118 of the drive shaft 20 mechanically engage the female connectors 116 of the second yoke 100, thereby preventing longitudinal and lateral movement of the second yoke 100 during rotation of the universal joint 18 about the longitudinal axis A, which reduces vibration of the universal joint 18 connected to the second yoke 100.

Figure 8:
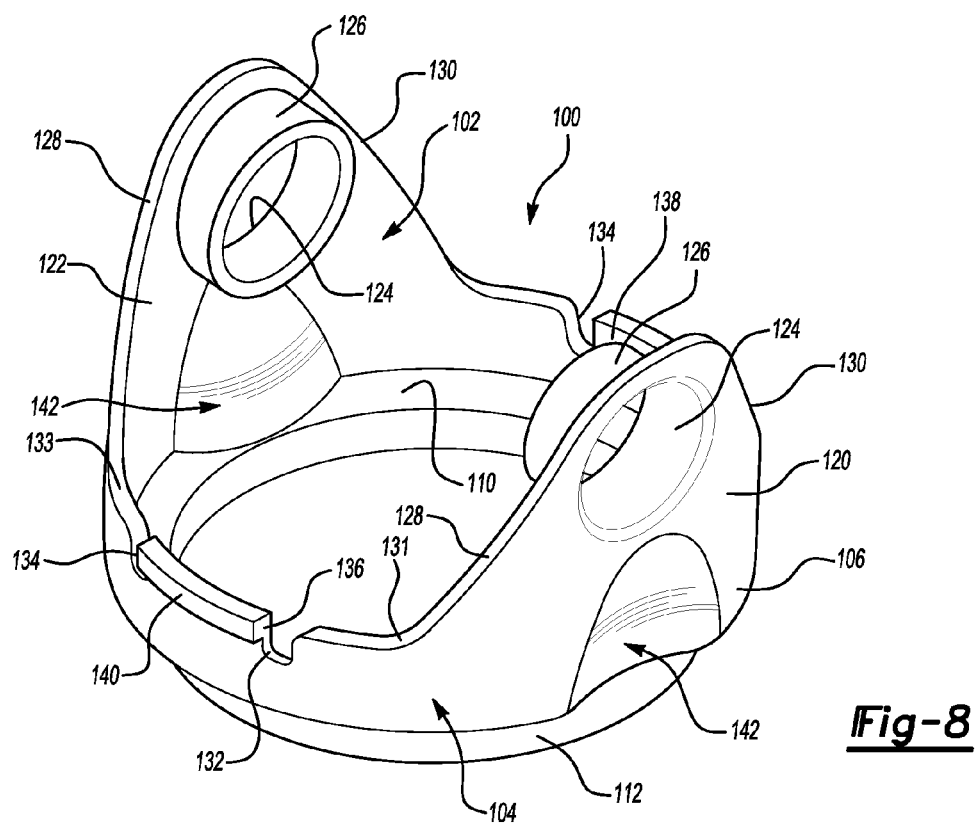
FIG. 8 is a perspective view of an alternative embodiment of the yoke portion of the universal joint assembly.
Figure 9:
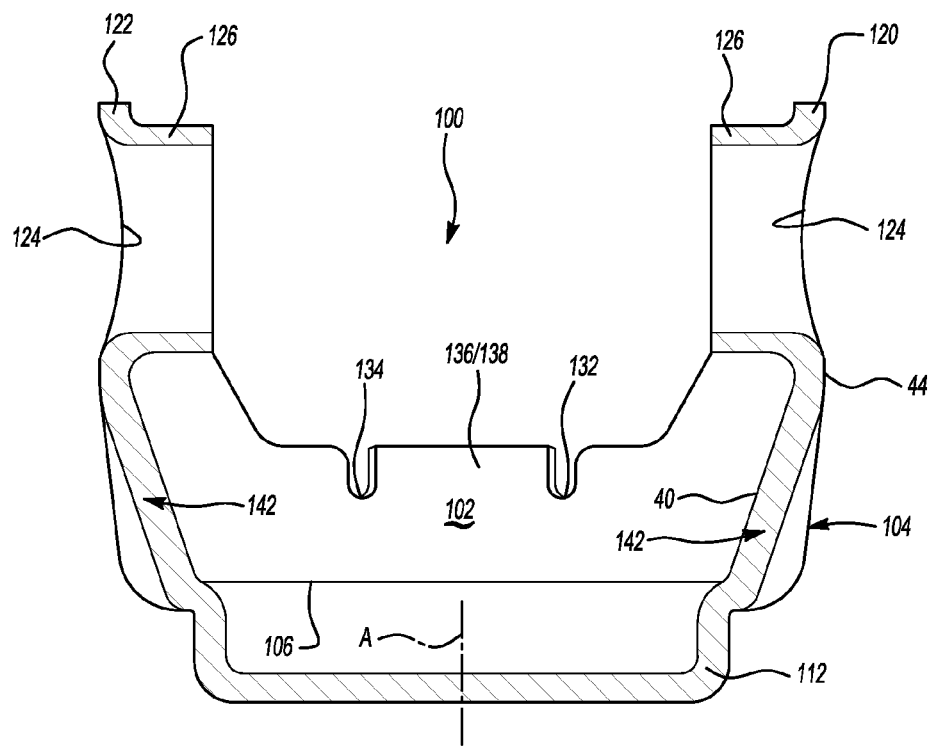
FIG. 9 is a cross sectional view of the yoke portion shown in FIG. 8.

A pair of spaced lugs 120 and 122 extends outwardly from the cup portion 106. Each of the spaced lugs 120 and 122 presents an opening 124. The spaced lugs 120 and 122 are oriented diametrically with respect to one and the other. Each of the spaced lugs 120 and 122 includes an annular sleeve 126 integral with and circumscribing the opening 124. Each of the spaced lugs 120 and 122 includes side walls 128 and 130 sloping relative the longitudinal axis A. The dish 106 and each of the sloping side walls 128 and 130 are interconnected by scalloped corners 131 and 133, as shown in FIGS. 8 and 10. Alternatively, the dish 106 and each of the sloping side walls 128 and 130 are interconnected by non-scalloped corners, not illustrated in the present invention. The annular sleeve 126 extends outwardly from the internal surface 102 of the second yoke 100. The annular sleeve 126 presents a mechanical engagement with a pair of the first 34, 36 or second 38, 40 trunnions of the cruciform assembly 28 in a manner known to those skilled in the differential art. In addition, the annular sleeve 126 provides additional structural reinforcement for locking the pair of the first 34, 36 or second 38, 40 trunnions of the cruciform assembly 28 within and between the spaced lugs 120 and 122. A plurality of notches 132 and 134 are defined in the cup portion 104.

A pair of oppositely spaced tabs 136 and 138 is defined between each with each notch 132 and 134. Each of the spaced tabs 136 and 138 terminates in a folded lip portion 140 to strengthen the second yoke 100 in this area of cut off. An indentation or muscle, generally indicated at 142, is deformed in each of the spaced lugs 120 and 122 for strengthening the spaced lugs 120 and 122. The muscle 142 is formed by stamping the external surface 104 of the second yoke 100 to form a concavely curved cavity, which extends to a convexly curved portion of the gusset 142 as viewed from the internal surface 102. Preferably, the gusset 142 presents a triangular configuration as viewed from the external surface 104 of the second yoke 100 and a beveled triangular configuration as viewed from the internal surface 102.

Figure 12:
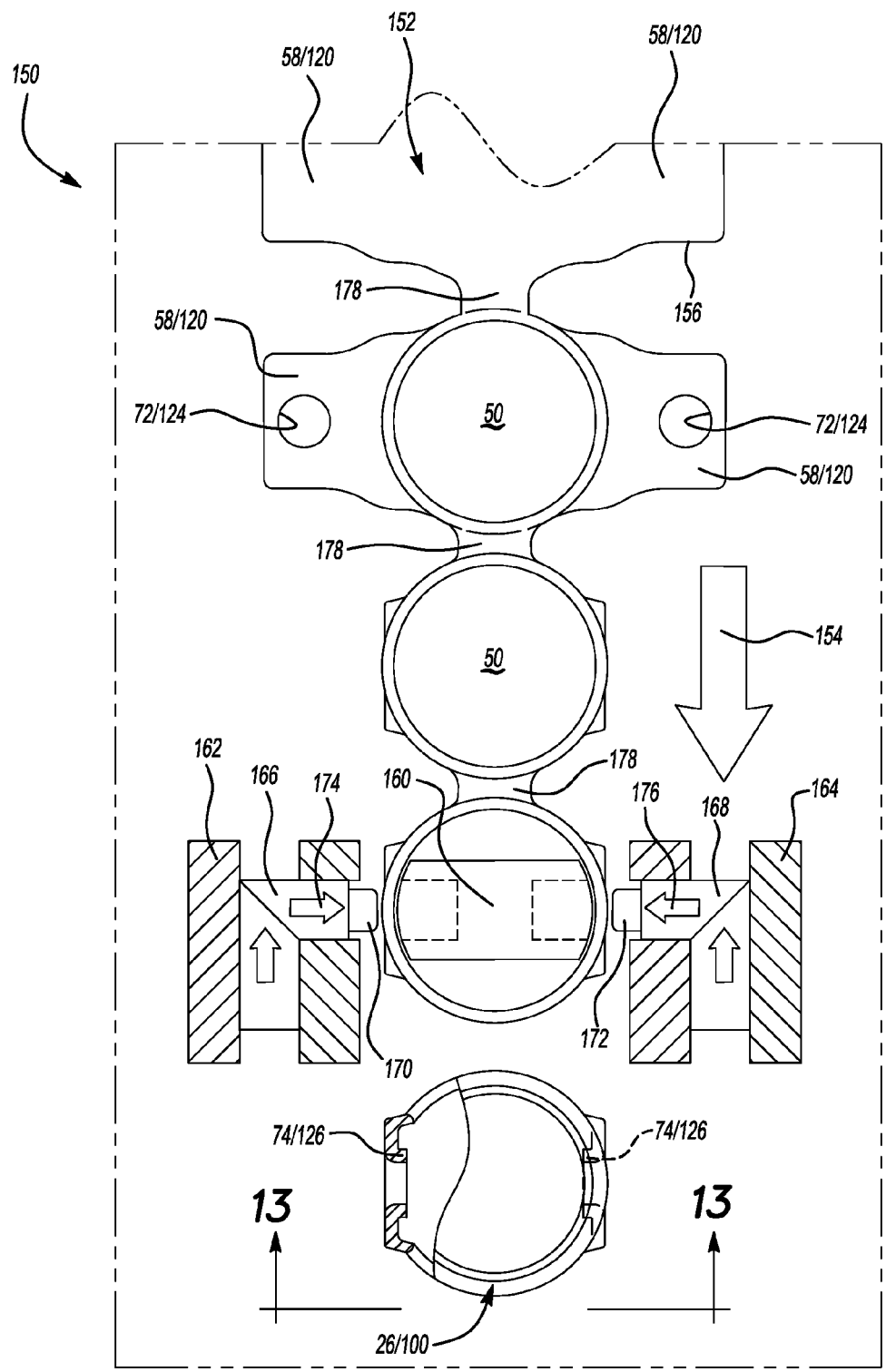
FIG. 12 is a top view of the progressive stamping stages of forming the yoke portion.
Figure 13:
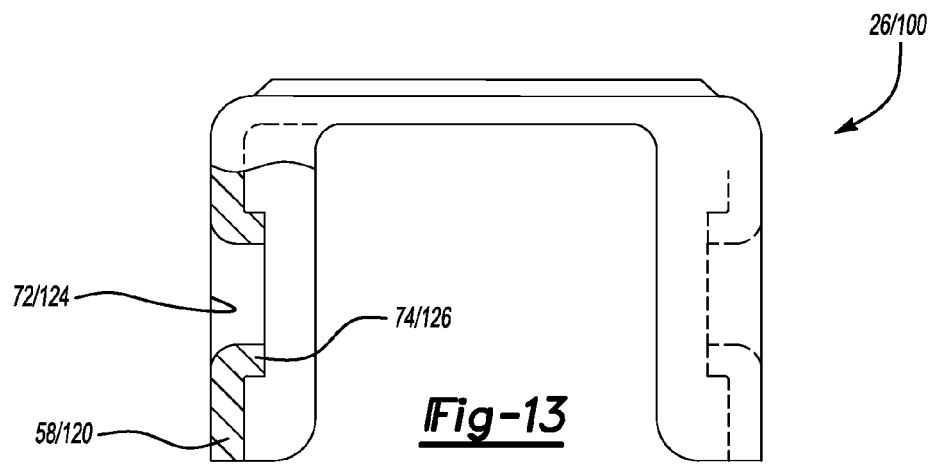
FIG. 13 is a cross sectional view of the yoke portion having an annular sleeve circumscribing an opening defined in spaced lugs of the yoke portion formed by a stamping process.
Figure 14:
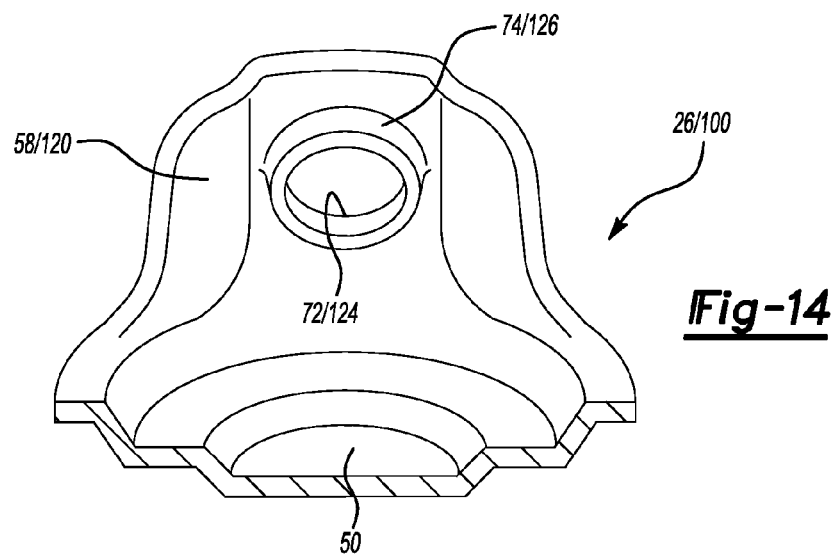
FIG. 14 is a fragmental perspective view of the yoke portion having the annular sleeve taken from the inner side of the yoke portion.
Figure 15:
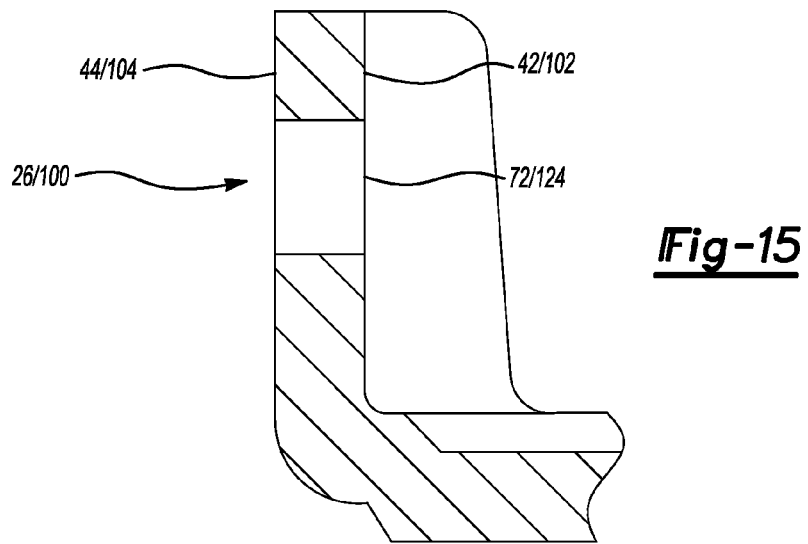
FIG. 15 a cross sectional view of an alternative embodiment of the yoke portion having the spaced lugs of increased thickness formed by a stamping process.

The yoke portions 26 and 100 are formed by a progressive stamping, generally shown at 150 in FIG. 12, which is distinguished from machining, the shaping of metal by removing material (drilling, sawing, milling, turning, grinding, etc.) and from casting, wherein metal in its molten state is poured into a mold, whose form it retains on solidifying. The progressive stamping 150 is a metalworking process that can encompass punching, coining, bending and several other ways of modifying metal raw material, a strip of metal, generally indicated at 152, as it unrolls from a coil (not shown), supplied by an automatic feeding system (not shown). The automatic feeding system pushes the strip of metal 152 in a progressive direction 154 through all of the stations or stages of the progressive stamping 150, as discussed further below. Each station performs one or more operations until a finished part, such as the yoke portion 26 or 100 is formed. These operations are performed by a progressive stamping die (not shown). The progressive stamping die is placed into a reciprocating stamping press (not shown). As the reciprocating stamping press moves up, the progressive stamping die opens. When the progressive stamping press moves down, the progressive stamping die closes.

When the stamping press opens, the strip of metal 152 is feed therein by the automatic feeding system pushes the strip of metal 152 in the progressive direction 154, as best illustrated in FIG. 12. As the stamping press closes, the progressive stamping die performs work on the raw material.progressive stamping die, such as punching a contour 156 of the yoke portion, which includes the aforementioned spaced lugs and a bottom of the yoke portion. As the progressive stamping 150 proceeds, the openings 72, 124 are punched out in each of the spaced lugs and the bottom of the yoke portion is stamped or deformed into the aforementioned dish. As the automatic feeding system pushes the strip of metal 152 in the progressive direction 154, the spaced lugs are bent to extend substantially perpendicular to the bottom of the yoke portion. As the strip of metal 152 is feed along the progressive direction 154 a button member 160 is inserted between the spaced lugs to provide a support for the spaced lugs as a pair of opposite die members 162 and 164 are oriented to form the annular sleeves 74 or 126. The mechanical aspects of the opposite die members 162 and 164 are known to those skilled in the stamping art. A pair of sliding mechanisms 166 and 168 of the respective opposite die members 162 and 164 terminated into a press die 170 and 172. The diameter of each press die 170 and 172 is larger than the diameter of the openings 72, 124 to facilitate stamping of the annular sleeves 74, 126 as the sliding mechanisms 166 and 168 are moved towards one and the other in the respective punching directions 172 and 174 as the press dies 170 and 172 force the metal around the openings 72, 124 into the annular sleeve 74 and 126. The final stage of the progressive stamping 150 separates the finished part, i.e. the yoke portion 26 and 100 from a carrying web or link 178. The carrying web or link 178, along with metal that is punched away in the previous operations, is treated as scrap metal.

The yoke portion 26 and/or 100 are manufactured from a high strength low allow steel manufactured by Worthington Steel Company. Preferably, a cold bending process is used to manufacture the yoke portion 26. As compared to prior art heat treated of steel processes that leave carbon content on the part, which prevents two part from being properly fused in laser welding process, the cold bending is the most practical, accepted, and economical way to make large-radii bends and preserving structural integrity of the part, such as, for example, the yoke portion 26.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A die formed yoke for a universal joint of an automotive driveline assembly subject to the torsional loads of an automotive driveline assembly having a substantially constant thickness, comprising:
    a cup-shaped portion having an annular side wall;
    a pair of spaced opposed lugs integral with said annular side wall of said cup-shaped portion each having opposed coaxially aligned annular sleeve portions extending radially from said lugs;
    said annular side wall of said cup-shaped portion having an end portion including a plurality of spaced axial notches; and
    a radial lip portion integral with and extending from an end portion of said annular side wall between said notches strengthening said yoke.

2. A die formed yoke for a universal joint of an automotive driveline assembly subject to the torsional loads of an automotive driveline assembly having a substantially constant thickness formed from a sheet of high strength low alloy steel, comprising:
    a cup-shaped portion having an annular side wall extending generally parallel to an axis of rotation of said cup-shaped portions;
    a pair of spaced opposed lug portions integral with an end portion of said annular side wall of said cup-shaped portion extending from an end of said annular side wall;
    a radial lip portion integral with and deformed outwardly from an upper end portion of said annular side wall between said lug portions strengthening said yoke; and
    said lugs each having an annular sleeve extending generally perpendicular to said lugs and coaxially aligned.

3. The die formed yoke as defined in claim 2, wherein said end portion of said annular wall includes axial notches and said radial tab portions located between said notches.

4. The die formed yoke as defined in claim 2, wherein said annular side wall of said cup-shaped portion is frusto-conical.

5. The die formed yoke as defined in claim 2, wherein said lug portions each include a concave reinforcing dimple formed without increasing a thickness of said lugs.

6. The die formed yoke as defined in claim 5, wherein said dimples extend into an end portion of said lugs adjacent said cup-shaped portion.

* * * * *